United States Patent
Lemke et al.

(10) Patent No.: US 9,260,825 B2
(45) Date of Patent: Feb. 16, 2016

(54) ROAD-BUILDING MACHINE

(75) Inventors: Bernd Lemke, Moringen (DE); Michael Neuhaus, Hess-Oldendorf (DE)

(73) Assignee: ABG Allgemeine Baumaschinen-Gesellschaft mbH, Hameln (DE)

( * ) Notice: Subject to any disclaimer, the term of this patent is extended or adjusted under 35 U.S.C. 154(b) by 0 days.

(21) Appl. No.: 14/128,282

(22) PCT Filed: May 24, 2012

(86) PCT No.: PCT/EP2012/002235
§ 371 (c)(1),
(2), (4) Date: Oct. 27, 2014

(87) PCT Pub. No.: WO2013/000530
PCT Pub. Date: Jan. 3, 2013

(65) Prior Publication Data
US 2015/0102637 A1    Apr. 16, 2015

(30) Foreign Application Priority Data

Jun. 25, 2011 (DE) .......................... 10 2011 105 556

(51) Int. Cl.
*B60J 7/00* (2006.01)
*E01C 19/00* (2006.01)
*B62D 33/06* (2006.01)

(52) U.S. Cl.
CPC ................ *E01C 19/00* (2013.01); *B62D 33/06* (2013.01); *B62D 33/0621* (2013.01); *E01C 2301/30* (2013.01)

(58) Field of Classification Search
CPC ............ C08L 2666/08; B60G 17/0165; B60G 17/01925; B60G 17/056; C05B 17/00; C05F 1/005; E04F 10/0614

USPC ............................................. 296/190.08, 163
See application file for complete search history.

(56) References Cited

U.S. PATENT DOCUMENTS 3,472,550 A * 10/1969 Marco ................ B66F 9/07545
                                                              280/748
3,618,692 A * 11/1971 Stikeleather ......... B62D 33/067
                                                              180/89.14

(Continued)

FOREIGN PATENT DOCUMENTS

BE        734792 A     12/1969
CN     101298752 A     11/2008

(Continued)

OTHER PUBLICATIONS

International Search Report and Written Opinion of PCT/EP2012/002235 mailed on Jul. 23, 2012, 9 pages.

(Continued)

*Primary Examiner* — Kiran B Patel
(74) *Attorney, Agent, or Firm* — Kilpatrick Townsend & Stockton LLP

(57) ABSTRACT

The invention relates to a road-building machine, comprising a drivable chassis (1) on which a driver's cab (3) having a control panel (2) is provided. A canopy (5) that is fixed to the chassis by at least one support (6) is arranged above the driver's cab, wherein at least one support (6) is adjustably arranged on the chassis (1) such that the canopy (5) can be lowered for a transport position and raised for a working position. For a working position with reduced set-up height, the lowered canopy (5) forms a free space (9) for an operator in the region of the control panel (2) of the driver's cab (3), wherefore a canopy section covering the control panel (2) is designed such as to be movable relative to the chassis (1).

10 Claims, 21 Drawing Sheets

(56) References Cited

U.S. PATENT DOCUMENTS

| | | | | |
|---|---|---|---|---|
| 3,620,564 A * | 11/1971 | Wenger | | E04H 3/28 160/19 |
| 3,872,678 A * | 3/1975 | Shuttleworth | | E21D 23/063 405/293 |
| 3,912,297 A * | 10/1975 | Mitsuishi | | E02F 9/163 280/756 |
| 3,917,310 A * | 11/1975 | Mitsuishi | | B60R 21/11 280/756 |
| 4,026,118 A * | 5/1977 | McCay, Jr. | | B62D 33/06 405/291 |
| 4,079,792 A * | 3/1978 | Paul | | E21D 20/003 173/189 |
| 4,336,964 A * | 6/1982 | Pivar | | B60J 5/0487 180/210 |
| 4,621,858 A * | 11/1986 | Hagenbuch | | B60P 1/26 296/56 |
| 5,033,913 A * | 7/1991 | Woodford | | E21D 23/04 405/295 |
| 5,042,835 A * | 8/1991 | Burns | | B60R 21/131 280/756 |
| 5,474,363 A * | 12/1995 | Hagenbuch | | B60P 1/16 298/23 DF |
| 5,806,622 A * | 9/1998 | Murphy | | B60J 5/02 180/210 |
| 5,842,732 A * | 12/1998 | Daggett | | B60J 7/1657 135/88.01 |
| 5,843,548 A * | 12/1998 | Sanders | | B32B 27/18 135/87 |
| 7,032,957 B2 * | 4/2006 | Miller | | B60P 1/286 296/183.1 |
| 7,152,903 B2 * | 12/2006 | Westendorf | | B62D 33/0625 296/102 |
| 7,257,467 B2 * | 8/2007 | Hagenbuch | | G06F 17/5096 414/806 |
| 7,320,380 B2 * | 1/2008 | Ueda | | E02F 9/0808 180/327 |
| 7,673,931 B2 * | 3/2010 | Takano | | B62D 33/0625 180/89.14 |
| 8,430,604 B2 * | 4/2013 | Onsori | | E21D 23/04 405/294 |
| 8,827,374 B2 * | 9/2014 | Huhn | | E01C 23/088 299/39.2 |
| 8,876,189 B1 * | 11/2014 | Williams | | E04H 15/08 296/160 |
| 2008/0007090 A1 * | 1/2008 | Ayabe | | B60R 21/11 296/190.03 |
| 2014/0292035 A1 * | 10/2014 | Doi | | B62D 33/0617 296/190.09 |

FOREIGN PATENT DOCUMENTS

| | | |
|---|---|---|
| CN | 101676491 A | 3/2010 |
| DE | 9206935 U1 | 5/1992 |
| DE | 29609704 U1 | 5/1996 |
| DE | 10260902 A1 | 7/2004 |
| DE | 202007005756 U1 | 10/2008 |
| EP | 2166154 A2 | 3/2010 |

OTHER PUBLICATIONS

English translation of the first Office Action corresponding to the Chinese Application No. 201280031124.5, dated Jun. 24, 2015.

* cited by examiner

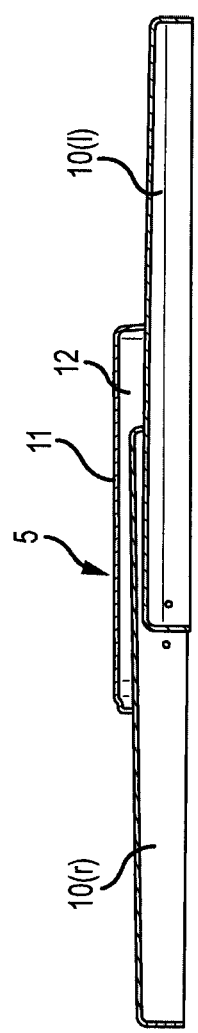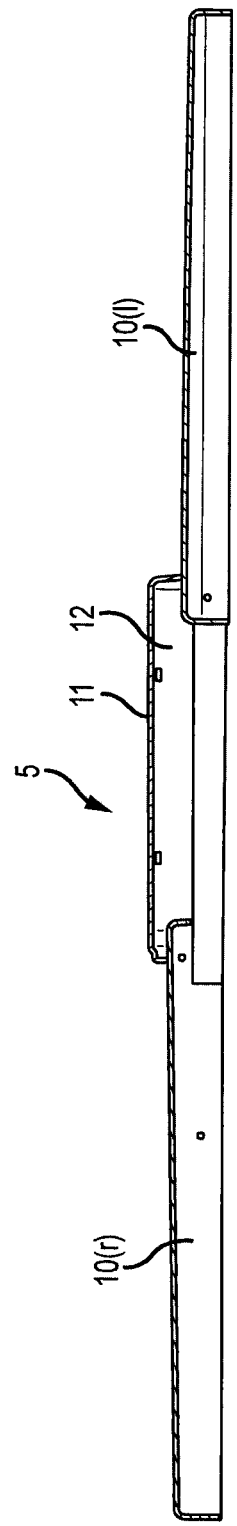

ROAD-BUILDING MACHINE

The invention relates to a road-building machine with a drivable chassis and a canopy mounted for swivel movement on the chassis above a driver's cab according to the preamble of claim 1.

From EP 2 166 154 A2 a canopy structure of this kind is known for a driver's cab of a building machine. The canopy is mounted on at least one front frame part and on at least one rear frame part wherein the frame parts are mounted for swivel movement on the building machine so that the canopy can be retracted and folded out in order to bring this selectively into a working position or into a transport position. So that the canopy structure also covers the outer side regions of a driver's cab, laterally extensible canopy overhangs are provided or the complete canopy is mounted for lateral displacement relative to the building machine. These are however only makeshift solutions. The drawback is that the canopy structure can be obstructive under working conditions.

From DE 296 09 704 U1 a road-building machine is known having a canopy which is held on the chassis by only two supports. This provides better access to the driver's cab. For transporting the road-building machine the supports together with the canopy can be pivoted in the driving direction and/or counter to the driving direction, i.e. forwards or backwards, into the transport direction. The transport height of the road-building machine can thus be reduced, for example for transport on a low-loader. Each support can additionally be curved in an arc in order to achieve the optimum low transport height in the transport position. A hydraulic cylinder can be provided as the swivel adjusting drive and can be remote-controlled very comfortably. The drawback is that the canopy can be obstructive under working conditions.

From DE 20 2007 005 756 U1 a self-propelled building machine, more particularly a road milling machine, is known in which the driver's cab is preferably surrounded by a weather-protective unit which is movable together with the driver's cab. Thereby the weather-protective unit can consist of a cabin. The cabin can preferably be folded or lowered or turned down for transport so that the maximum transport dimensions of the building machine when transported on a low-loader can be kept small for driving under bridges. The cabin can by way of example be turned down about an axis running parallel to the driving direction when its width transversely to the driving direction is considerably narrower than its height. The drawback also here is that the cabin can be obstructive under working conditions.

From DE 92 06 935 U1 a drivable road surface finishing machine is known which has a driver's cabin which can be turned into a transport position in order that its outlines remain inside the permissible transport height when the surface finishing machine is loaded onto a low loader. The drawback again is that the driver's cabin can be obstructive under working conditions.

The object of the invention is therefore to provide a road-building machine which is fitted with a protective canopy which can be handled simply and comfortably for working operations and also transport operations.

This is achieved through the features of claim 1.

A road-building machine is hereby provided with a protective canopy which offers the driver the maximum weather protection and maximum freedom of movement when working. The canopy can be folded down to transport the road-building machine. The road-building machine can furthermore according to the invention be safely operated from the driver's cab with the canopy folded in. Sufficient working space remains for an operator or machine engineer. The road-building machine can then be used in a working operation or a shunting operation underneath obstructions which require a lower height structure. The maneuverability of the road-building machine in the region of height restrictions, such as are caused for example by trees, bushes, bridges and other obstructions, is thereby considerably improved. The folded position of the protective canopy for transport operation is thereby used in order to be able to avoid additional swivel movements of the canopy. Furthermore the handling of the canopy is simply maintained if the canopy can only swivel between two folding positions, namely folded out on the one hand and folded in on the other.

The canopy is preferably designed as a multi-part roof shell whose roof shell segments are slidable relative to one another. The roof shell segments preferably do not lie at the same level which enables a displacement thereof over one another. Such a roof shell segment can form a canopy section which covers the control panel. Sliding away one such canopy section then leads to a shortening of the canopy length in the lateral direction, preferably transversely to the driving direction. An overhang of the canopy at the side opposite the short side is thereby avoided.

Furthermore the canopy can be formed by means of the roof shell segments so that the canopy can be shortened in the lateral direction on both sides. A middle, preferably fixed, roof shell segment thereby advantageously has a roof length in the lateral direction which is greater than or at least as large as the length of the roof shell segments which can be slid under or over the middle roof shell segment. As an alternative the roof shell segments can form a slatted roof whose slats can be arranged on the chassis of the road-building machine so as to slide over one another and where applicable opposite one another. The roof shell segments can thereby be formed with different lengths in the lateral direction.

Further developments of the invention are to be drawn from the following description and dependent claims.

The invention will be explained in further detail below using embodiments illustrated in the accompanying drawings.

FIG. 20 to FIG. 23 show cross-sections of the canopy according to FIG. 19 with different positions of the roof shell segments of the roof shell of the canopy.

Figure 1:
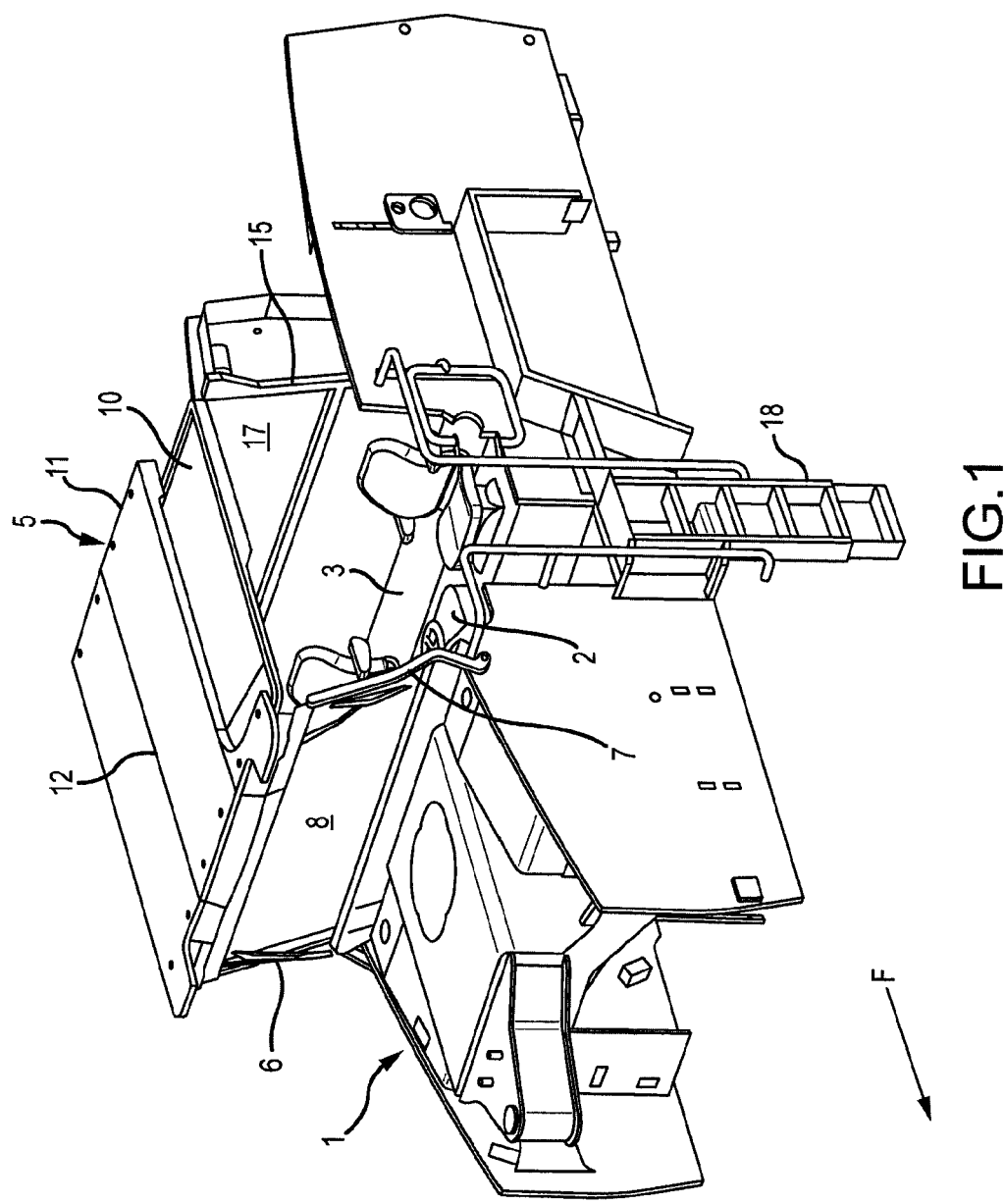
FIG. 1 shows diagrammatically a perspective view inclined from the front right of a canopy, fastened to a drivable chassis of a road-building machine, in a working position with the canopy unfolded.
Figure 2:
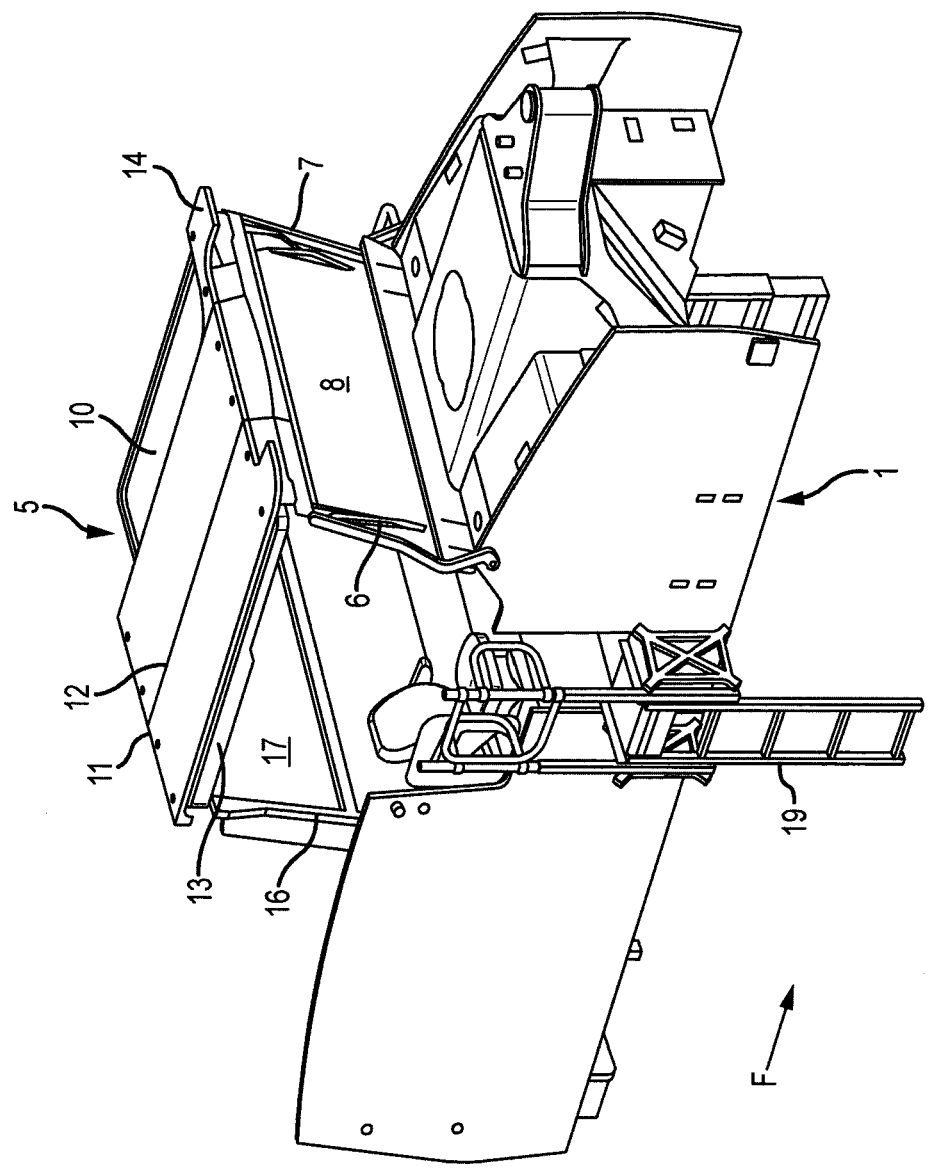
FIG. 2 shows diagrammatically a perspective view inclined from the front left of the canopy, fastened to the drivable chassis of a road-building machine, in the working position according to FIG. 1.
Figure 3:
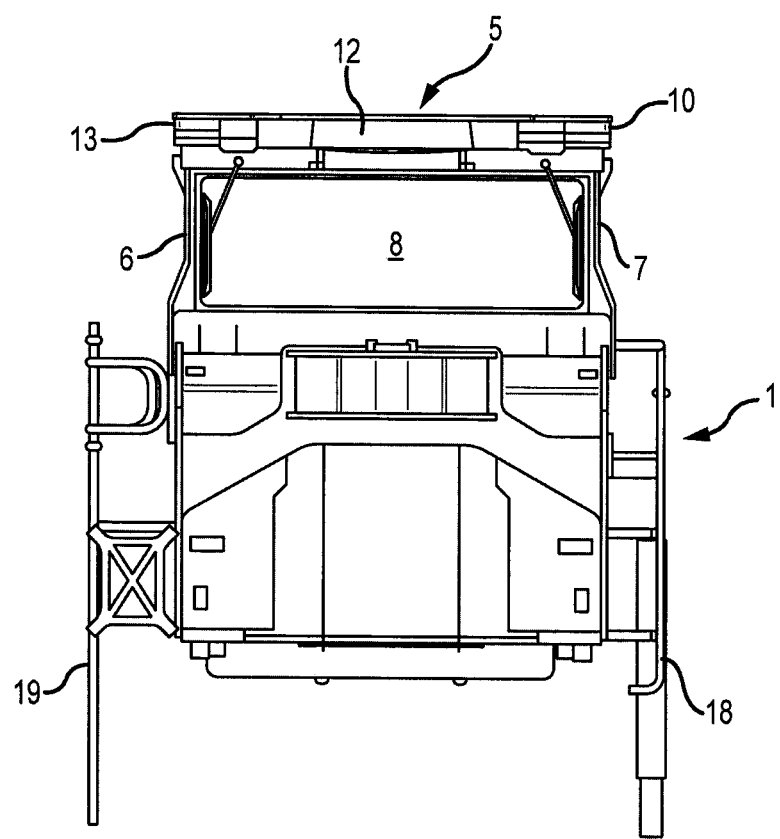
FIG. 3 shows diagrammatically a front view of the canopy, fastened to the drivable chassis of the road-building machine, in the working position according to FIGS. 1 and 2.
Figure 4:
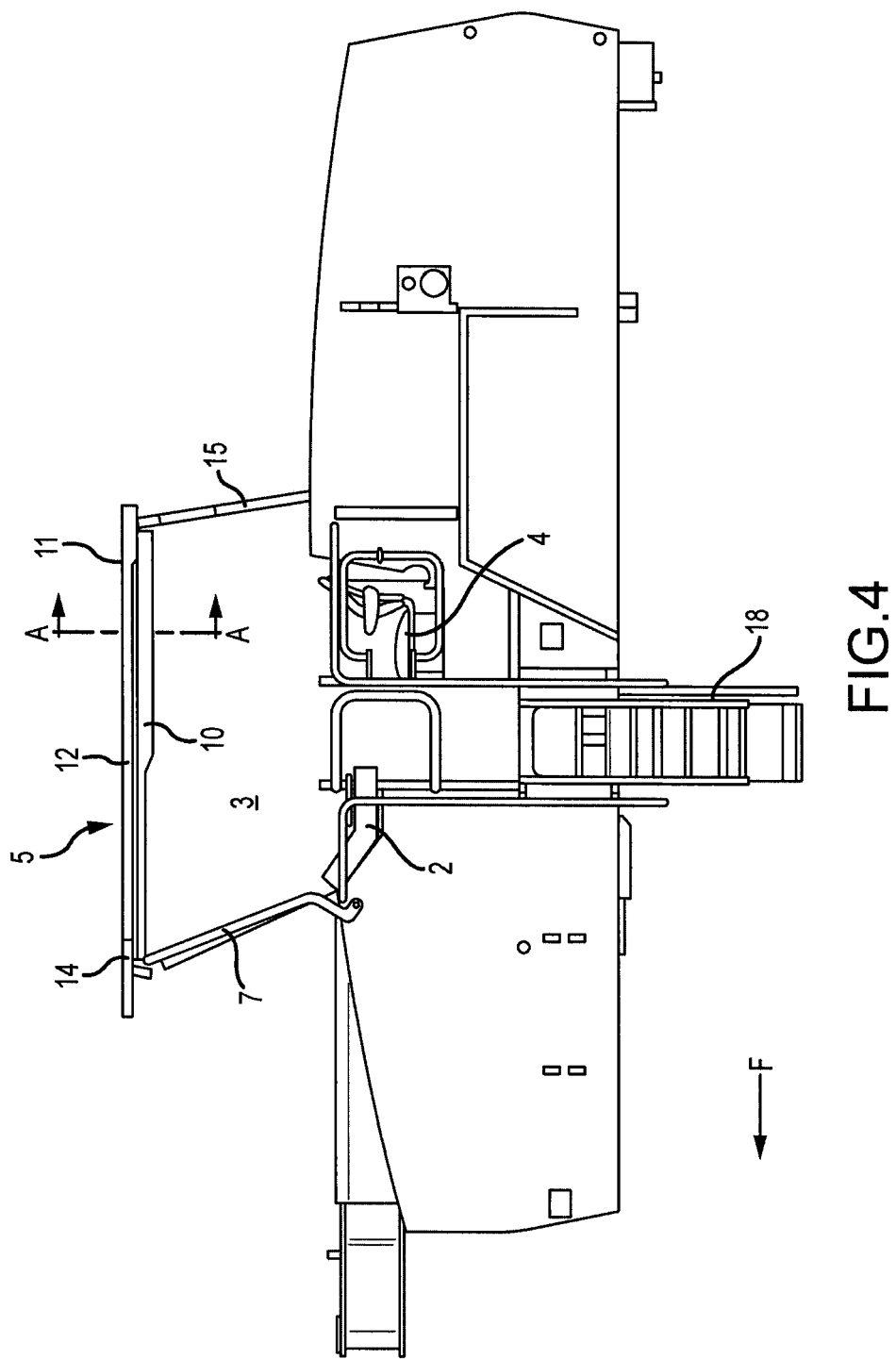
FIG. 4 shows diagrammatically a side view of the canopy, fastened to the drivable chassis of the road-building machine, in the working position according to FIG. 1.

As shown in FIG. 1, the invention relates to a road-building machine with a drivable chassis 1, on which a driver's cab 3 is provided which has a control panel 2. The road-building machine is controlled by an operator or a machine engineer (not shown) from the driver's cab 3, for which a driver's seat is preferably provided behind the control panel. The driving direction of the road-building machine is marked by F. The road-building machine can be a road finishing machine, a road milling machine, a road roller or the like.

Above the driver's cab 3 there is a canopy 5 which is mounted adjustably on the chassis 1 by at least one support 6 so that the canopy 5 can be lowered for a transport position and raised for a working position. According to the embodiment illustrated in FIG. 1 the canopy 5 is fixed on the chassis 1 by way of example by supports 6, 7 on either side. The supports 6, 7 are mounted for swivel movement on the chassis 1 so that the canopy 5 can be retracted for a transport position and folded out for a working position. The folding movement takes place by way of example in at least one driving direction F.

FIG. 1 shows the canopy 5 in the folded out working position in which a weather-protected working area is provided for the operator in the driver's cab 3. The folded out canopy 5 requires a set-up height wherein it can be adjusted via the length of the supports 6,7. The supports 6,7 can be integrated in a frame for a front windscreen 8.

Figure 9:
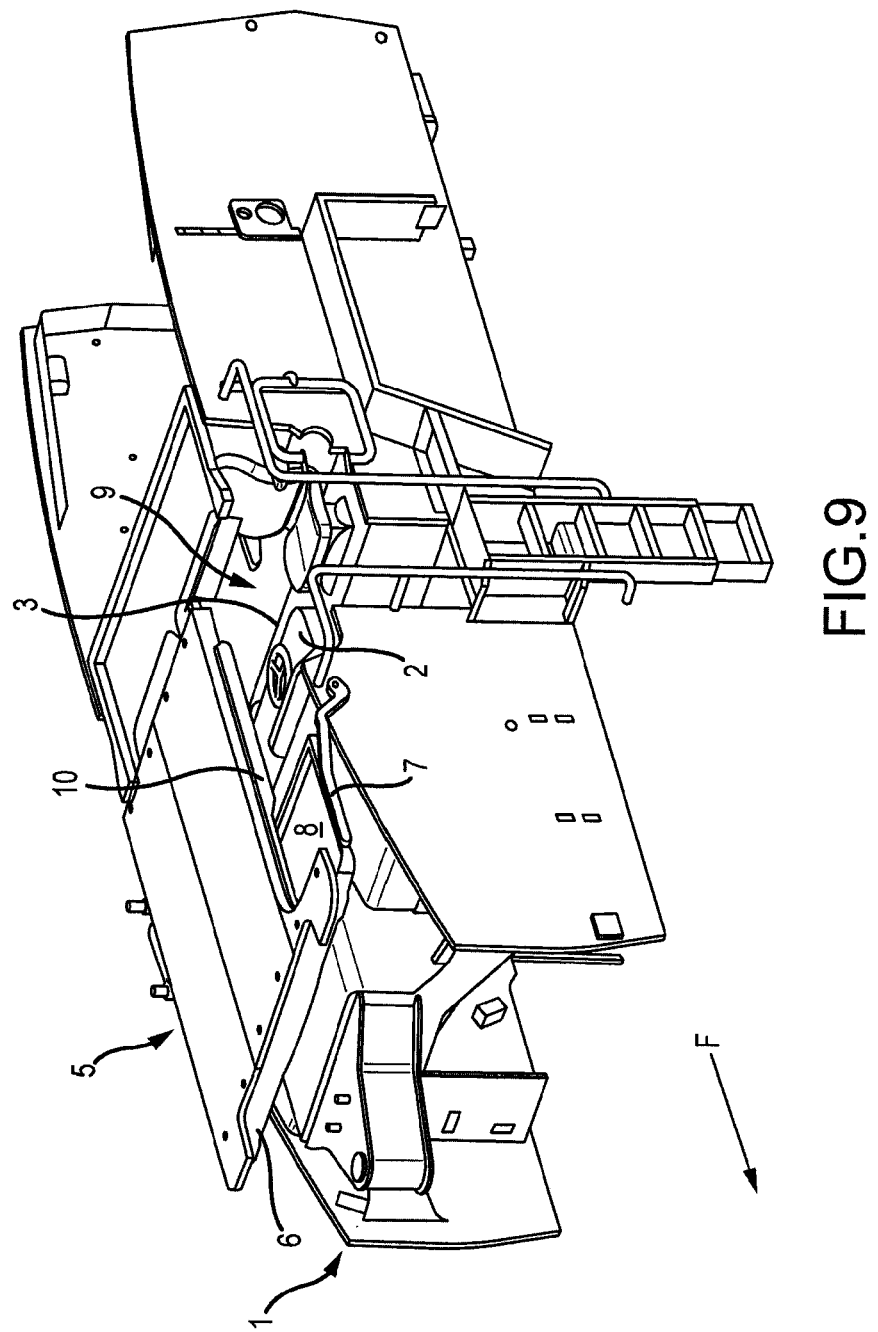
FIG. 9 shows diagrammatically a perspective view inclined from the front right of the canopy, fastened to the drivable chassis of a road-building machine, in a working position with the canopy folded in and with a canopy section pushed out of the way.

As shown in FIG. 9, for a working position with reduced set-up height, the retracted canopy 5 forms a free space 9 for an operator in the region of the control panel 2 of the driver's cab 3 wherefore a canopy section, preferably a roof shell segment 10, covering the control panel 2 is designed such as to be movable relative to the chassis 1. The canopy 5 can for this purpose be shortened, preferably at the sides, via the displaceable canopy section. As an alternative (not shown) the canopy 5 can be arranged displaced as a complete unit in the retracted position, which then has the result that the canopy 5 forms an overhang relative to the chassis 1 on the side opposite the free space 9 which is formed.

FIGS. 1 to 5 show the canopy 5 in the folded out working position. The active lateral roof length of the canopy 5 is preferably aligned transversely to the driving direction F. The canopy 5 has an at least two-part roof shell 11. The displaceable canopy section forms a roof shell segment 10 which determines with at least a second roof shell segment 12 a roof length in the lateral direction. The canopy section as the roof shell segment 10 and the at least second roof shell segment 12 are displaceable relative to one another. The assembly is preferably not at the same level which enables a displacement of same one above the other. The canopy section as a roof shell segment 10 is retractable and also where applicable extensible, as will be described below with reference to FIG. 11 to FIG. 14.

Figure 5:
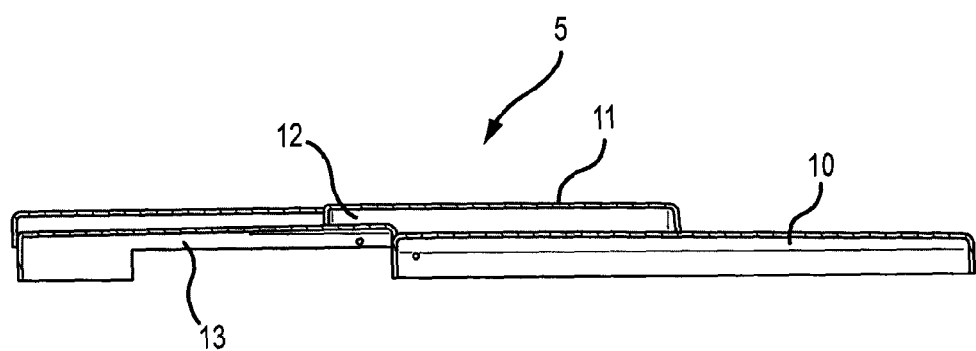
FIG. 5 shows a section A-A according to FIG. 4.

The second roof shell segment 12 is preferably arranged fixed as an at least middle roof shell segment, with roof shell segments arranged so as to be laterally displaceable relative thereto. A laterally displaceable roof shell segment 10 is the canopy segment. A third roof shell segment 13 which is displaceable relative to the second, preferably middle roof shell segment 12, can be provided which can be optionally extended as a lateral overhang. As shown in FIG. 5, these roof shell segments 10, 12, 13 of the roof shell 11 are arranged so as to be displaceable on different guide levels.

The canopy section as roof shell segment 10 can be guided at the front on a guide collar 14 in order to improve the holder of the canopy section for covering the driver's cab 3 in the working position of the folded out canopy 5.

Figure 6:
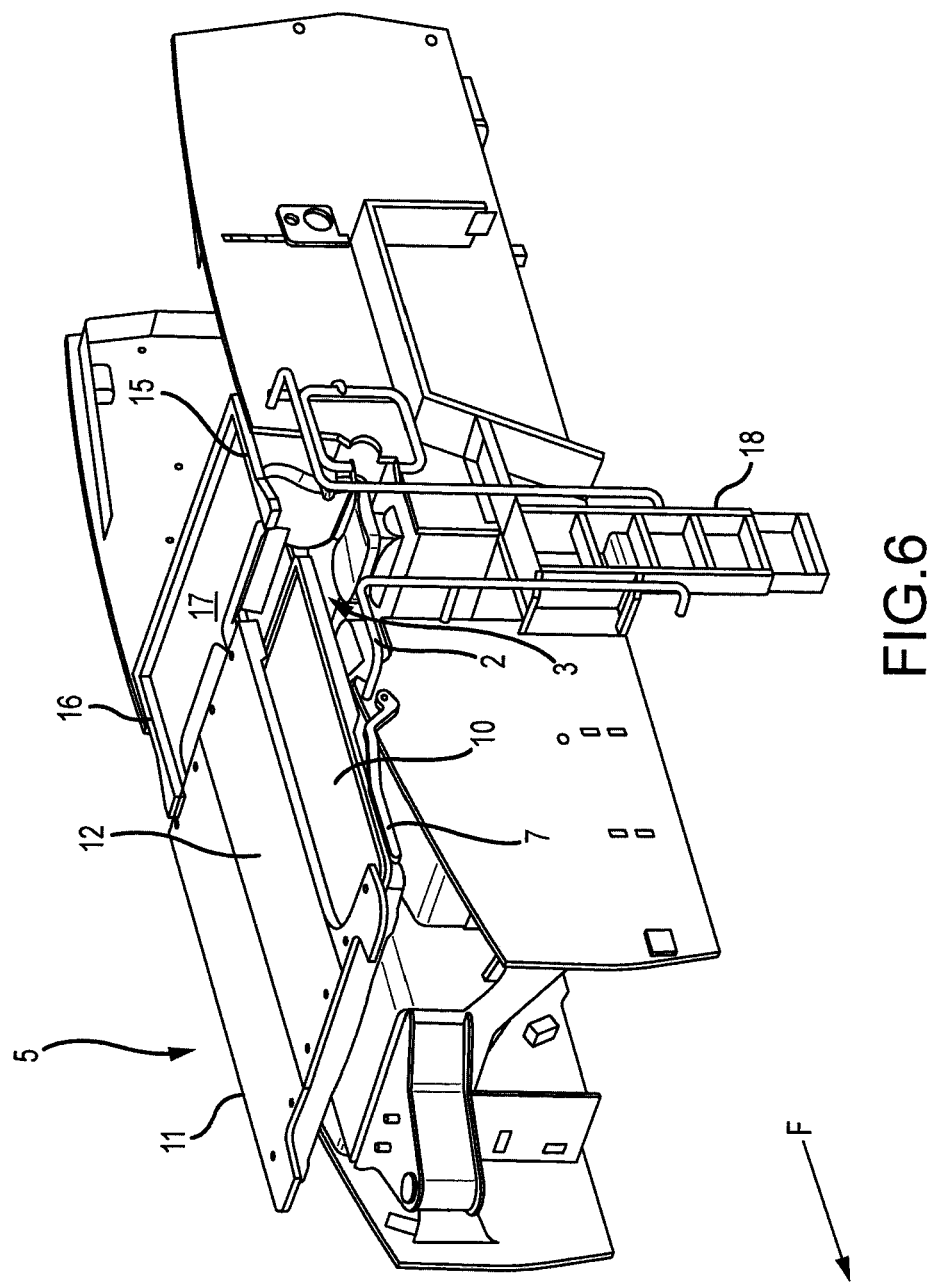
FIG. 6 shows diagrammatically a perspective view inclined from the front right of the canopy, fastened to the drivable chassis of a road-building machine, in a transport position.
Figure 7:
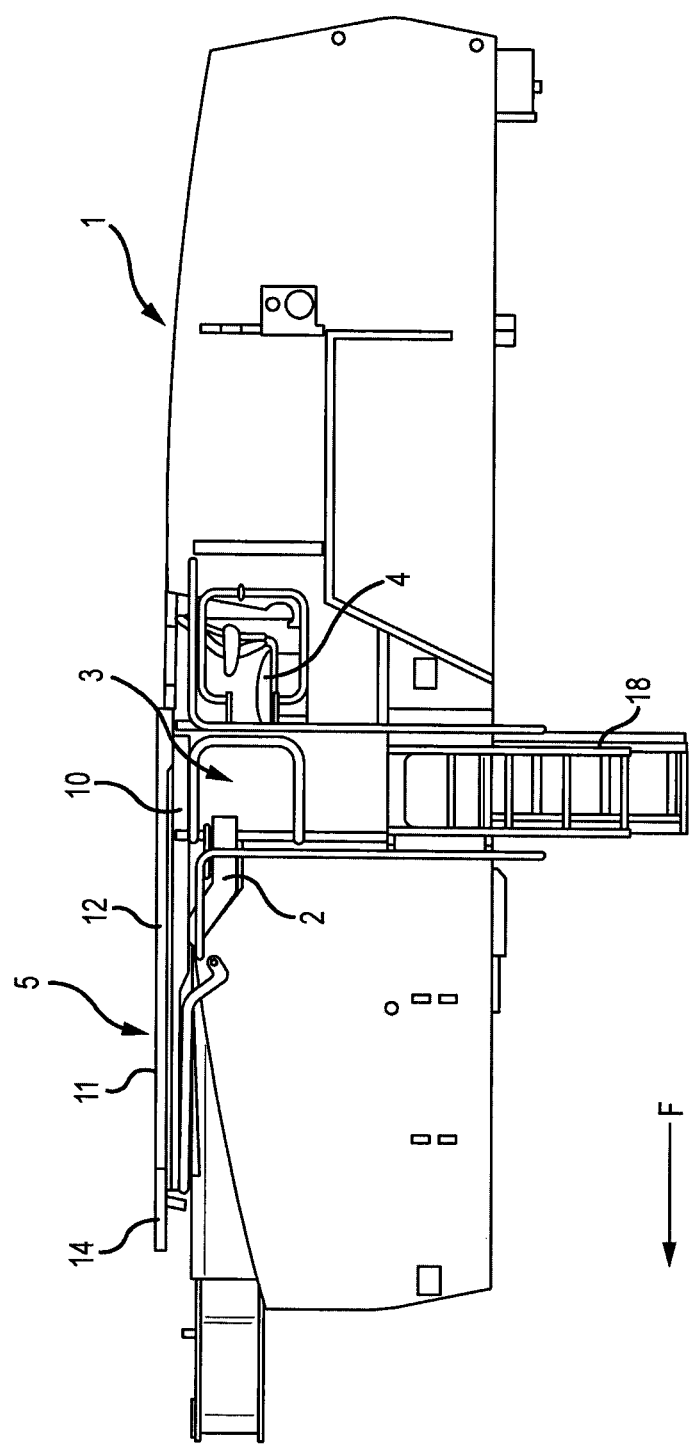
FIG. 7 shows diagrammatically a side view of the canopy fastened to the drivable chassis of the road-building machine, in the transport position according to FIG. 6.

FIG. 6 and FIG. 7 show the canopy 5 in the retracted transport position wherein the canopy section as roof shell segment 10 covers the control panel 2 and thus as a cover protects this for transport of the road-building machine. The canopy 5 can be mounted at the back on supports 15, 16 which can be integrated in a frame for holding a rear windscreen 17.

Figure 8:
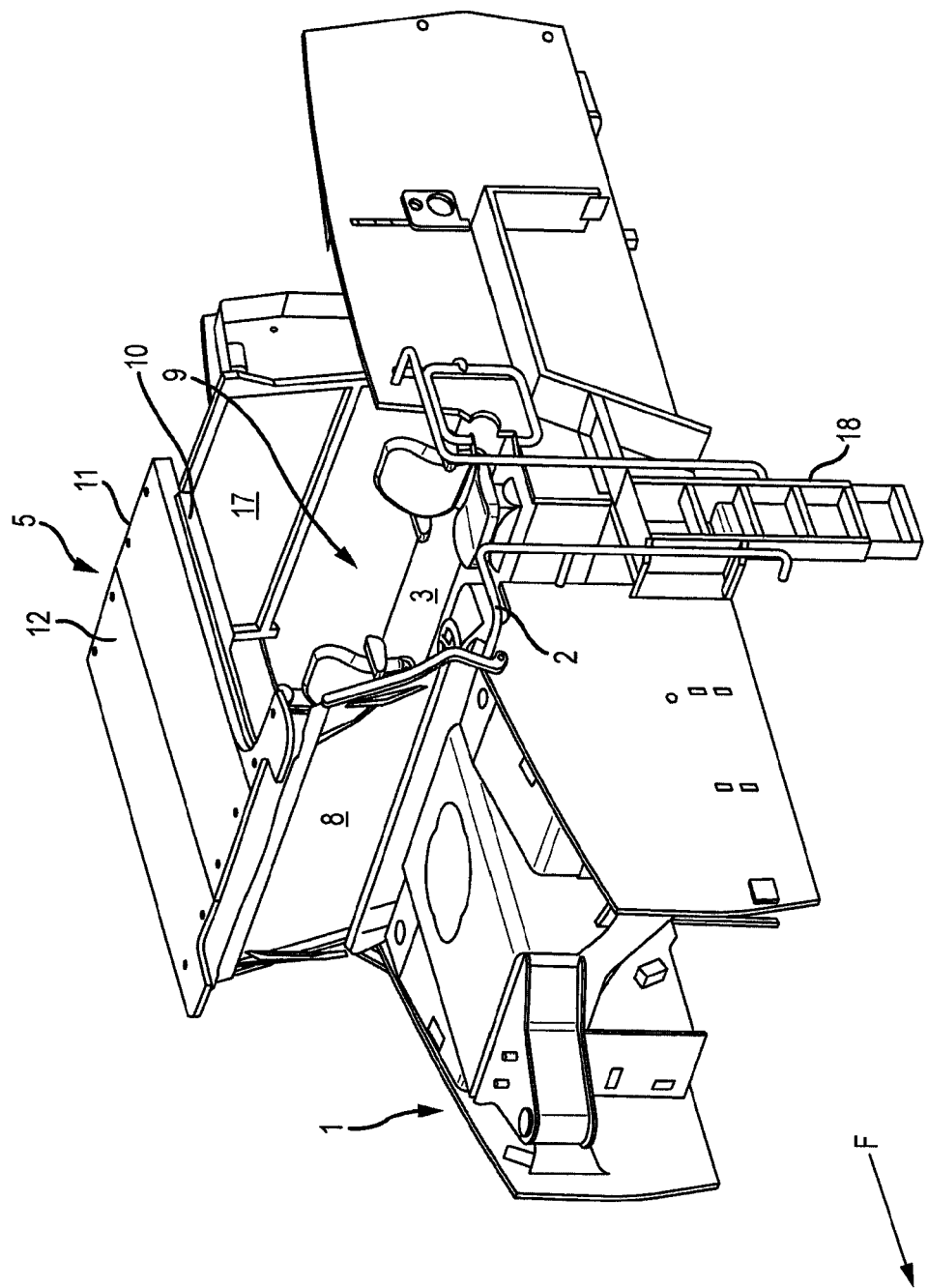
FIG. 8 shows diagrammatically a perspective view inclined from the front right of the canopy, fastened to the drivable chassis of a road-building machine, in the working position with a canopy section pushed out of the way.
Figure 10:
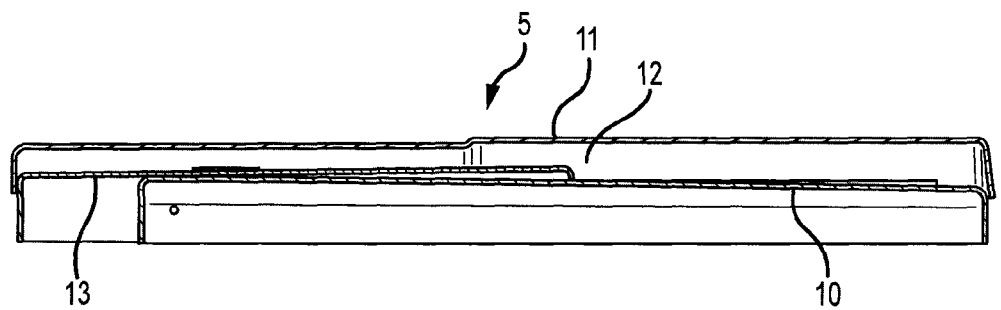
FIG. 10 is a cross-section through the canopy according to FIG. 8 and FIG. 9.
Figure 11:
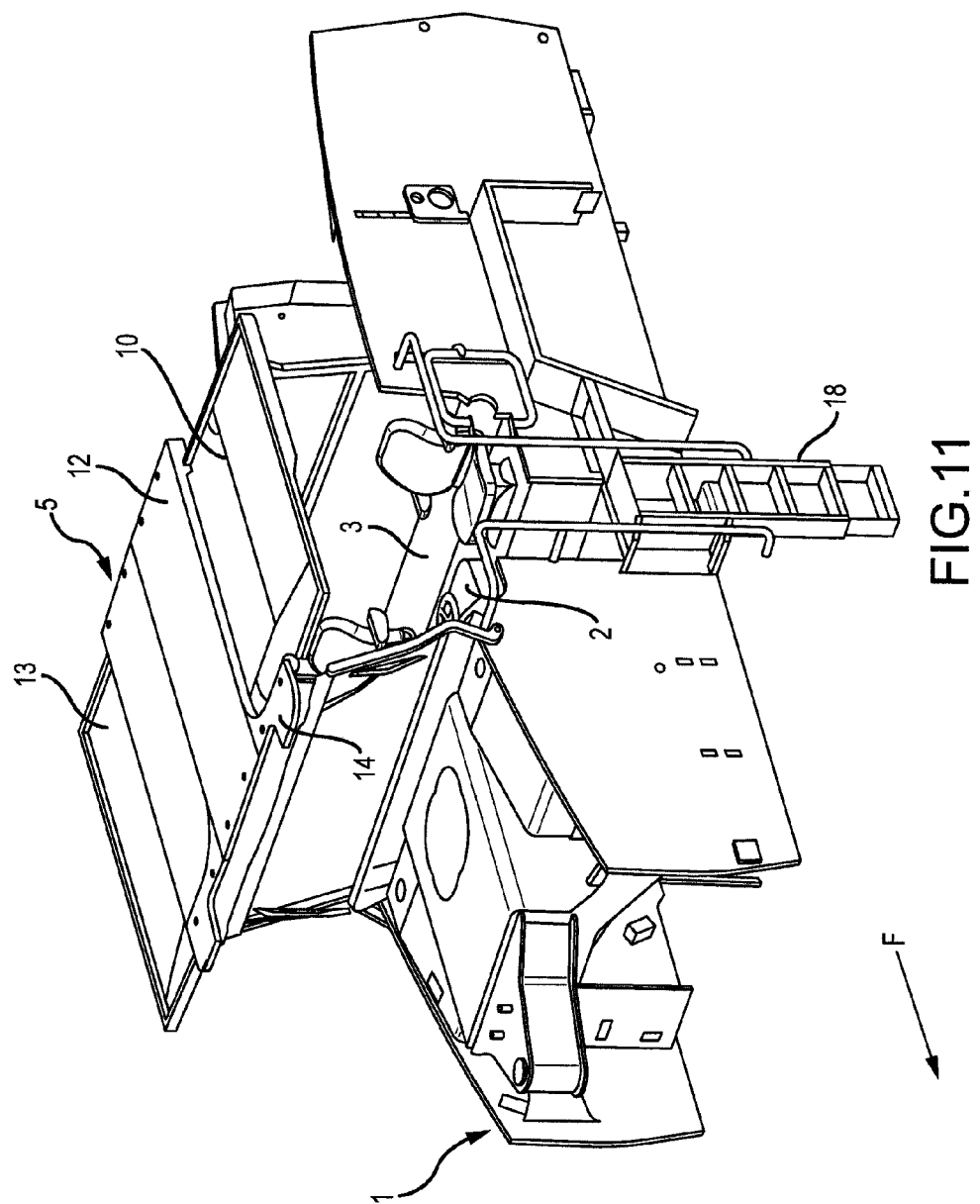
FIG. 11 shows diagrammatically a perspective view inclined from the front right of the canopy, fastened to the drivable chassis of a road-building machine, in a working position with the canopy unfolded and laterally extended roof shell segments.
Figure 12:
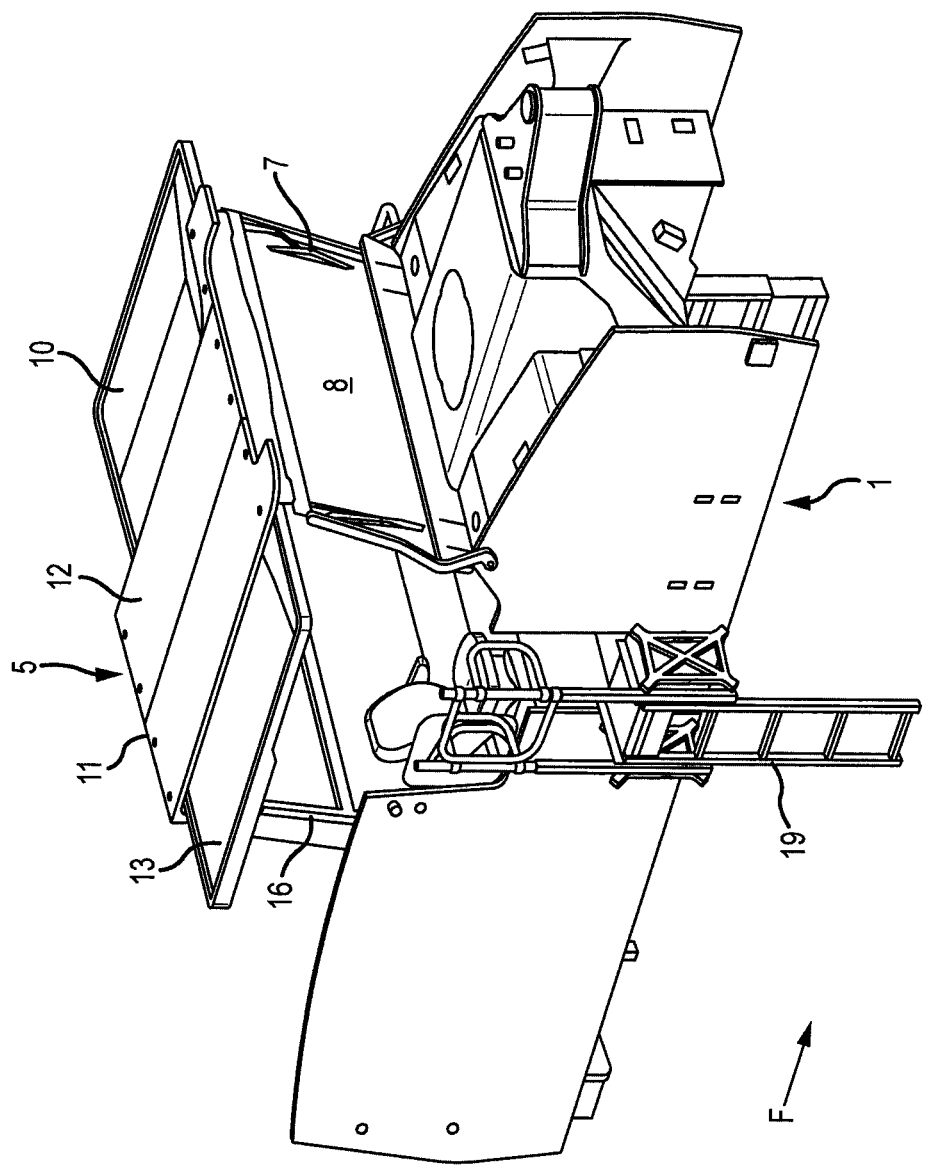
FIG. 12 shows diagrammatically a perspective view inclined from the front left of the canopy fastened to the drivable chassis of a road-building machine, in the working position according to FIG. 11.
Figure 13:
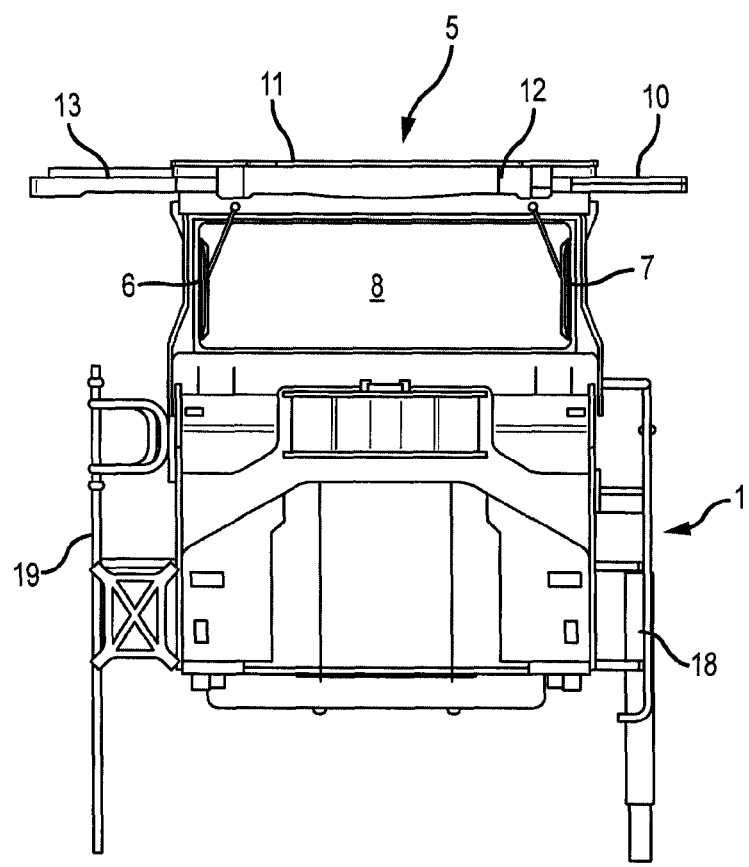
FIG. 13 shows diagrammatically a front view of the canopy, fastened to the drivable chassis of the road-building machine, in the working position according to FIG. 11 and FIG. 12.

FIG. 8 to FIG. 10 show the canopy 5 with a roof shell segment 10 as canopy section displaced laterally relative to the chassis 1 whereby a free space 9 is formed for an operator (not shown) in the region of the control panel 2 of the driver's cab 3. This free space 9 can be formed when the canopy 5 is folded out. This free space 9 can however always be made during operation when the canopy 5 is retracted, as shown in FIG. 9. This free space 9 provides an operator with sufficient space to operate the control panel 2 and thus operate and/or manoeuvre the road-building machine. The arrangement of the segments 10, 12, 13 of the roof shell 11 of the canopy 5 one above the other is illustrated in FIG. 10. The canopy 5 can thus be shortened in the lateral direction by sliding away one partial region, i.e. roof shell segment 10, whereby the covering disappears in the region of the control panel 2. The thus shortened canopy 5 can be moved from an unfolded state (FIG. 8) into a retracted state (FIG. 9).

FIG. 11 to FIG. 14 show an embodiment in which the canopy 5 can be formed with lateral overhangs. For this the canopy 5 can be extended laterally via the displaceable roof shell segment 10 as canopy section relative for example to a basic roof length which covers the driver's cab 3, but not side exit and/or entry areas 18, 19. These entry areas can likewise be covered with the overhangs which extend the canopy 5 at the sides temporarily. The overhangs are formed by an extensible roof shell segment 10 and the further extensible roof shell segment 13.

Figure 14:
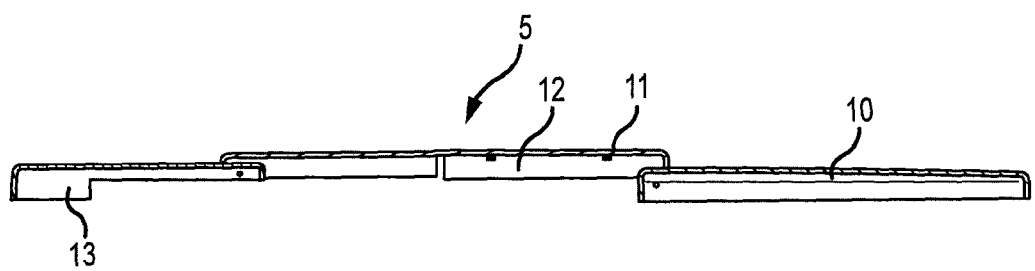
FIG. 14 is a cross-section of the canopy according to FIGS. 12 and 13.

FIG. 5, FIG. 10 and FIG. 14 show the vertical stagger of the guide planes for the roof shell segments 10, 12 and 13 of the roof shell 11. FIG. 5 shows the arrangement of the roof shell segments 10, 12 and 13 wherein the roof shell segment 10 for a working position and a transport position covers the driver's cab 3 above the control panel 2. FIG. 10 shows the arrangement of the roof shell segments 10, 12, 13 wherein the roof shell segment 10 is pushed underneath the roof shell segment 12 in order to form the free space 9 in the region of the driver's cab 3 so that an operator can operate the control panel 2. The third roof shell segment 13 which serves to form a lateral overhang is positioned so that its guide plane is arranged between that of the middle roof shell segment 12 and that of the roof shell segment 10. The roof shell segment 10 is the canopy section which covers the control panel 2. The canopy 5 can assume this arrangement when the canopy is folded out or retracted. More particularly this arrangement is provided when the canopy 5 is retracted so that the machine can carry out a working operation and/or maneuvering operation with a lower set-up height.

FIG. 14 shows the arrangement of the roof shell segments 10, and 13 wherein the roof shell segment 10 covers the driver's cab 3 in the region of the control panel 2 and entry area 18. On the opposite side the canopy 5 is extended by an extended overhang which is formed by the displaceable roof shell segment 13. The aforesaid figures show that the arrangement of the roof shell segments 10, 12 and 13 one above the other in different vertical positions enables the roof shell 11 to be extended or shortened as required in the lateral direction. Quasi a packet of superposed roof shell layered segments 10, 12, 13 is made of which the roof shell segments can be optionally retracted and extended. It is thereby essential that the canopy 5 can be retracted with the roof shell segment 10 folded.

In the embodiments of a road-building machine with a canopy 5 shown in FIG. 1 to FIG. 14, the roof shell 11 preferably comprises three roof shell segments 10, 12, 13.

Figure 15:
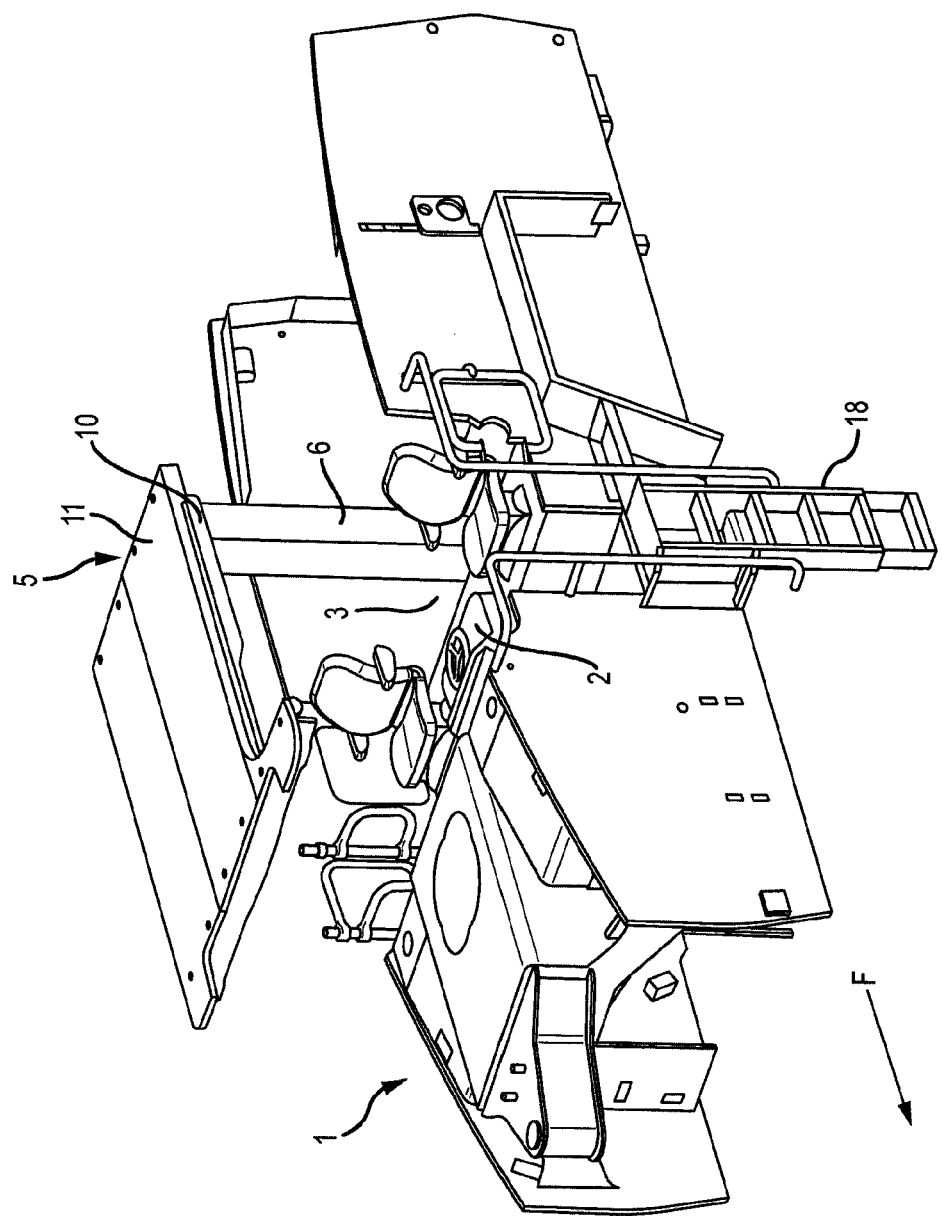
FIG. 15 and FIG. 16 show a view of an embodiment of a chassis with a telescopic support for mounting the canopy.
Figure 16:
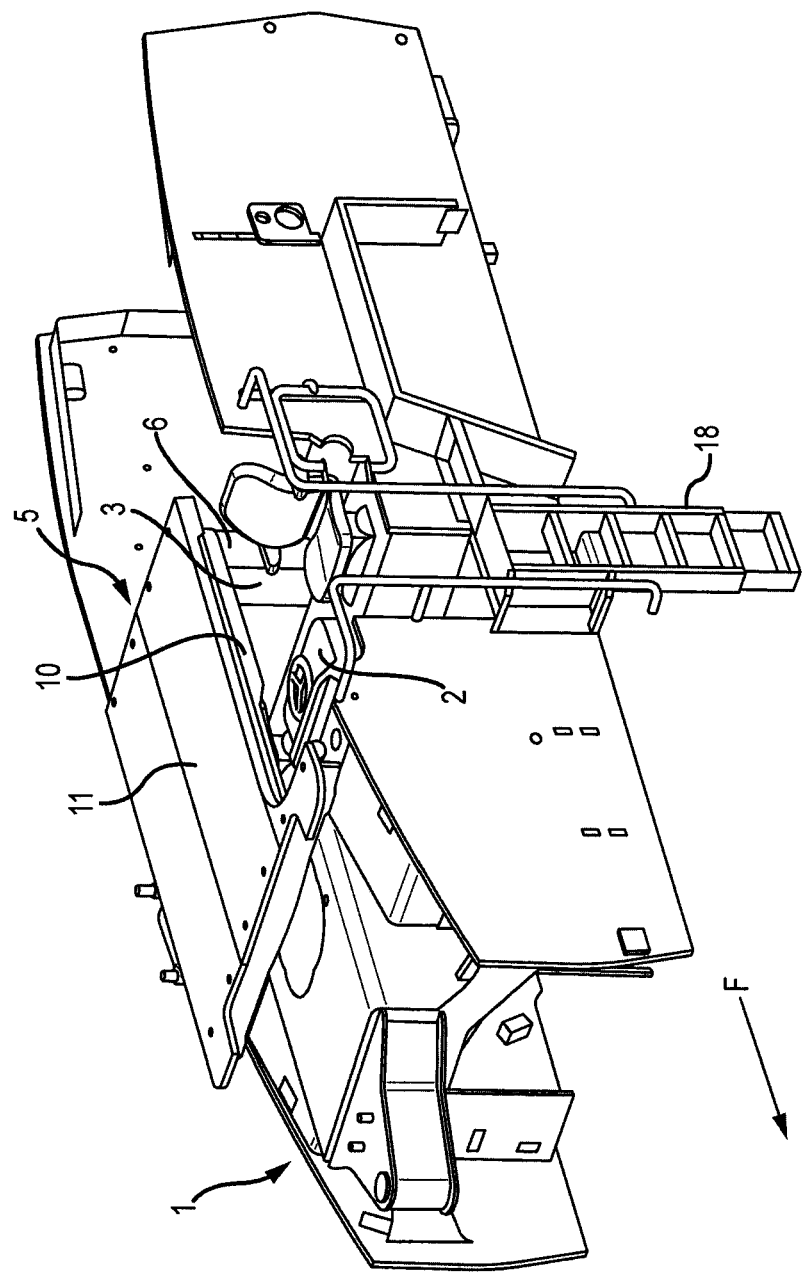

FIG. 15 and FIG. 16 show a further embodiment of the invention in which the canopy 5 is adjustable by means of a telescopic support 6 in order to be able to set up and lower the canopy 5. FIG. 15 shows the canopy 5 with the erected canopy. FIG. 16 shows the canopy with the lowered canopy 5. The telescopic capacity by using at least one support 6 enables the support 6 to be folded and extended whereby its height and thus the height adjustment of the canopy 5 relative to the driver's cab 3 is adjustable. The support 6 can thereby also be provided with bendable joints. For the rest applies accordingly the aforesaid for the embodiments described above.

Figure 17:
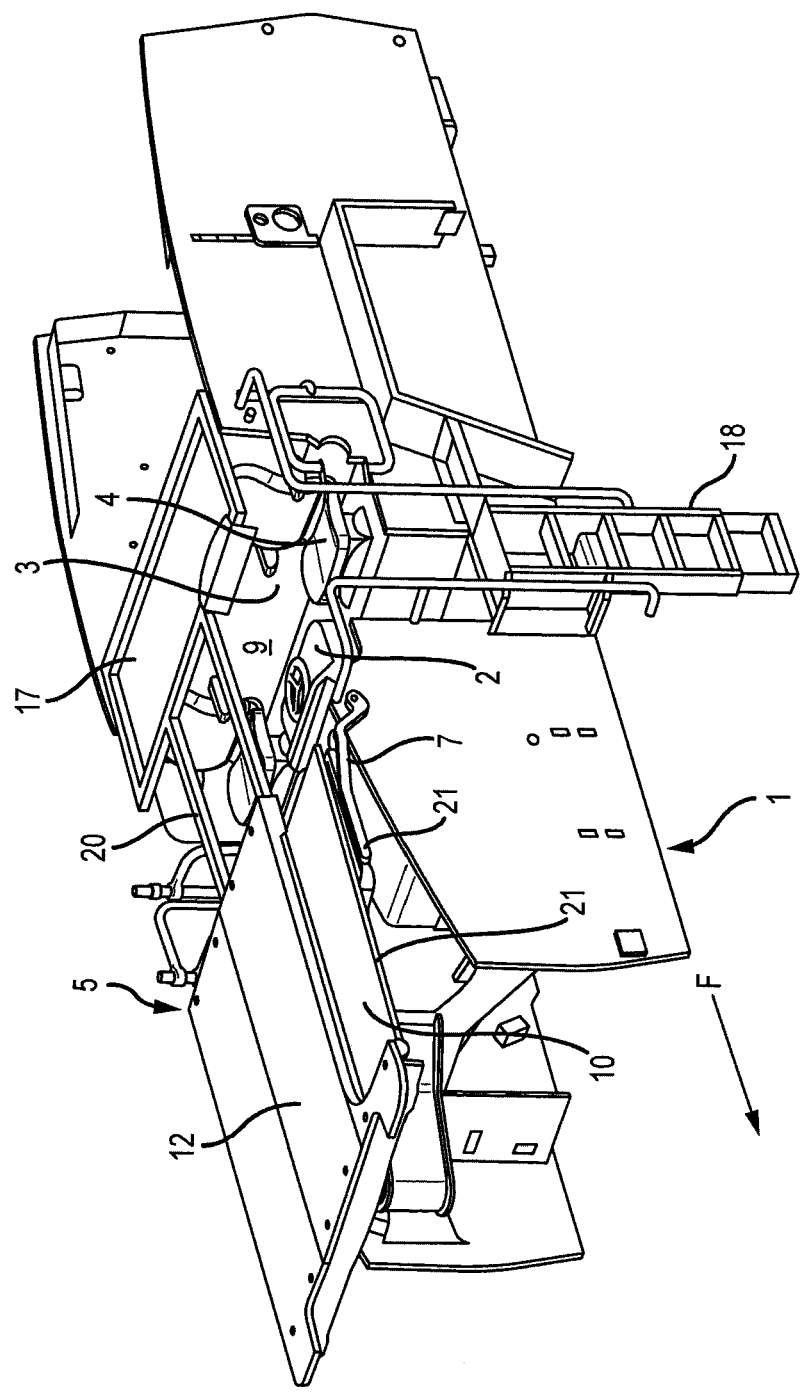
FIG. 17 and FIG. 18 show a view of embodiments of a chassis with a swivel-slide mechanism for adjusting he canopy.
Figure 18:
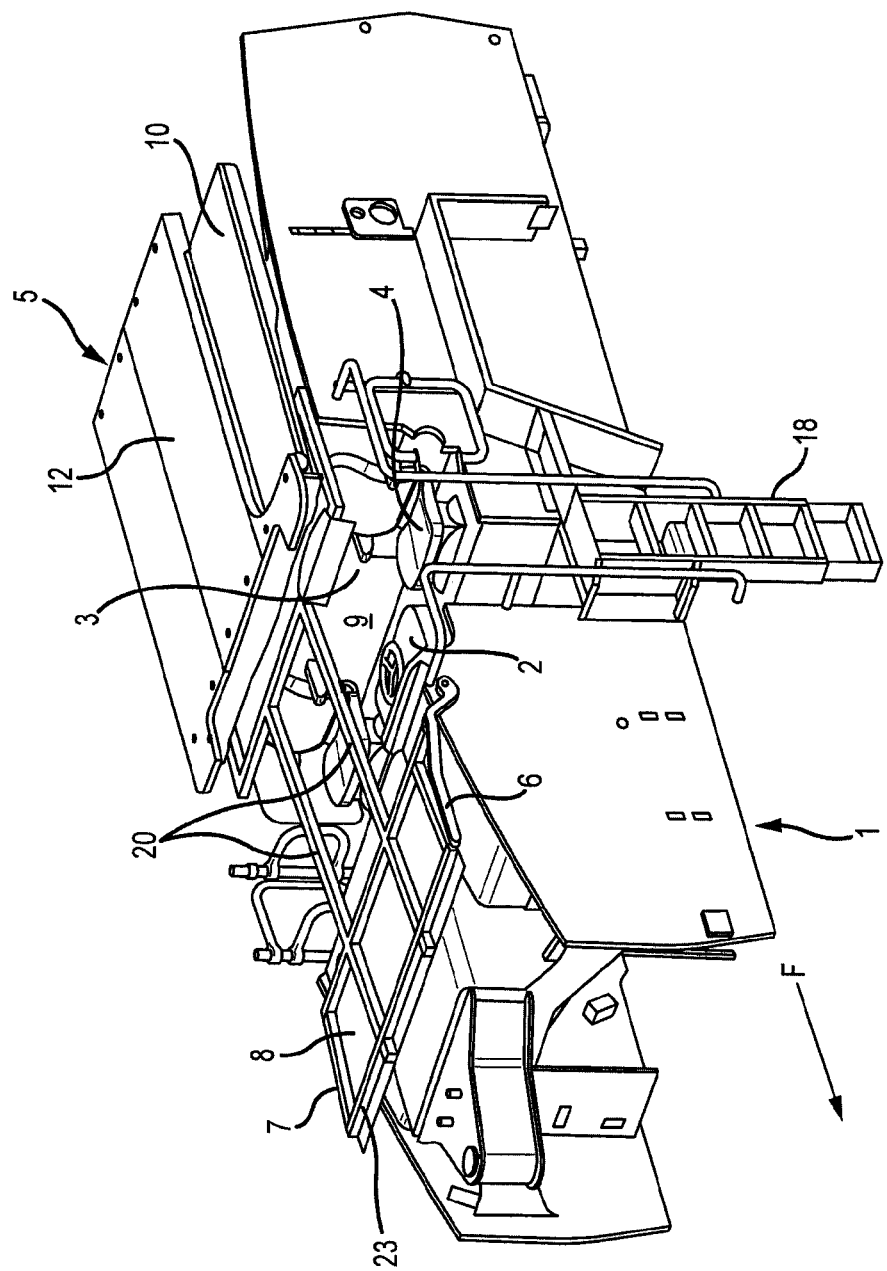

FIG. 17 and FIG. 18 show embodiments of a chassis 1 with a swivel-slide mechanism for adjusting the canopy 5. FIG. 17 shows the canopy 5 in a retracted position. The roof shell segment 10 which forms the canopy section which covers the control panel 2 on the left side is designed so as to be displaceable in order to provide a free space 9 for an operator when the canopy 5 is lowered. The displaceability is provided by a translatory displacement of the preferably entire canopy 5, for example in a forward and backward direction in relation to the driving direction F. For this a holder 20 can be provided which is guided on the canopy 5 displaceably relative to the chassis 1. FIG. 17 shows the displacement of the canopy 5 in a forward direction. The linkage of the supports 6, 7 can for this purpose slide in a guide 22. A space is thus provided between the canopy 5 and the rear windscreen 17, and the space is formed there where the free space 9 is provided for an operator when the canopy 5 is lowered. FIG. 18 shows the displacement of the canopy 5 in a backward direction. A space is thus provided between the canopy 5 and the front windscreen 8 in order to form the free space 9. The supports 6, 7 for setting up the canopy 5 on the chassis 1 are preferably integrated in a frame 23 of the front windscreen 8. The holder 20 on which the canopy 5 is guided displaceably is here preferably attached rotatably to this frame 23. For the rest applies accordingly the aforesaid for the embodiments described above.

Figure 19:
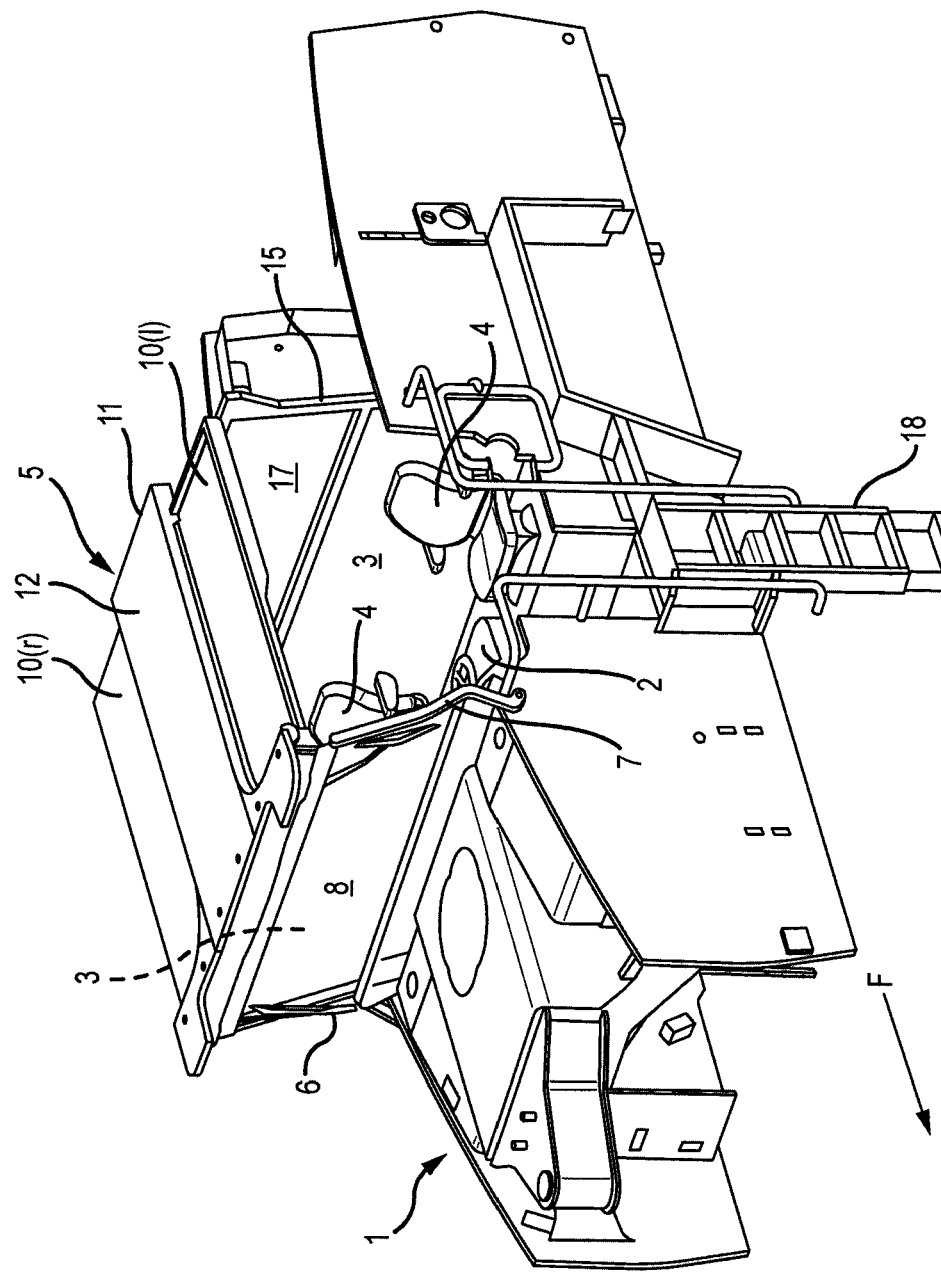
FIG. 19 shows a view of a canopy, fastened to the chassis, with roof shell segments for a left-hand and/or right-hand controlled operation of a road-building machine.

If the road-building machine has a right-hand and a left-hand control panel 2 the roof segment 10 can be formed on both sides of the canopy 5. FIG. 19 shows a view of a canopy 5 fastened on the chassis 1 and having roof shell segments 10(l) and 10(r) for a left-hand and/or right-hand controlled operation of a road-building machine. Deviating from the embodiment illustrated in FIG. 1, left and right displaceable roof shell segments 10(l) and 10(r) are provided as canopy sections in order to be able to form a free space 9 when the canopy 5 is lowered in the region of the left and also right control panel 2 in front of a driver's seat 4.

FIG. 20 to FIG. 23 show cross-sections of the canopy according to FIG. 19 with different positions of the roof shell segments 12, 10(l) and 10(r) of the roof shell 11 of the canopy 5 which are arranged on different levels and are arranged so as to be displaceable sideways relative to one another. FIG. 20 shows the canopy 5, as shown in a perspective view in FIG. 19. The two roof shell segments 10 (l) and 10(r) form with a middle roof shell segment 12 a canopy 5 whose lateral extension covers the driver's cab 3. The middle roof shell segment 12 is here preferably arranged fixed, which is however not absolutely necessary.

According to FIG. 21 the outer two roof shell segments 10(l) and 10(r) are slid out sideways relative to the middle roof shell segment 12 in order to enlarge the width of the canopy 5. Preferably the entry areas 18, 19 can then also be covered by the roof shell segments 10(l) and 10(r).

Figure 22:
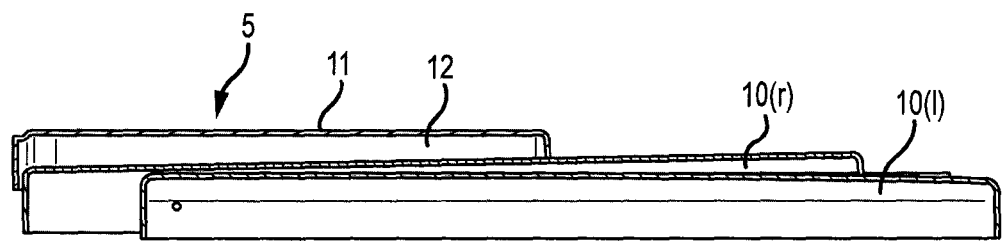
Figure 23:
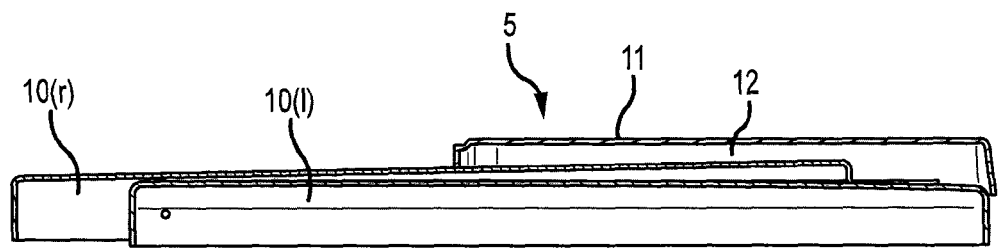

The positioning according to FIG. 22 differs from that according to FIG. 20 in that one roof shell segment 10(r) is pushed in in order to provide when the canopy 5 is lowered the free space 9 for the operator in the region of the control panel 2, e.g. here for a right-hand control panel. By selecting the width of the roof shell segments 10(r) and 10(l) it is possible to reach a partial covering of the two roof shell segments 10(r) and 10(l), as shown in FIG. 22. The corresponding applies for sliding the roof shell segments 10(l) in order to provide with a lowered canopy 5 a free space 9 for the operator in the region of the control panel 2, e.g. for a left-hand control panel. For the rest applies accordingly the aforesaid for the embodiments described above.

According to an embodiment of the invention, not shown, the canopy 5 can have a number of roof shell segments which can be pushed together like slats to form a free space 9 in the retracted position of the canopy 5.

For all the embodiments described above it applies that different drives can be used for adjusting the canopy 5. Apart from a manual actuation an electric, pneumatic or hydraulic drive is preferably provided for adjusting the canopy 5.

The invention claimed is:
1. Road-building machine comprising a drivable chassis on which a driver's cab having a control panel is provided, above which a canopy is set up which is fixed on the chassis by at least one support, wherein at least one support is set up adjustably on the chassis so that the canopy can be lowered for a transport position and set up for a working position, wherein for a working position with reduced set-up height the lowered canopy forms a free space for an operator in the region of the control panel of the driver's cab, for which a canopy section covering the control panel is designed so as to be displaceable relative to the chassis; and wherein the canopy has roof shell segments which are arranged so as to be displaceable on different guide levels.

2. Road-building machine as claimed in claim 1 wherein the canopy is arranged with supports on both sides for swivel movement on the chassis so that the canopy can be retracted for a transport position and folded out for a working position.

3. Road-building machine as claimed in claim 1 wherein the canopy can be lowered and set up by at least one telescopic support.

4. Road-building machine as claimed in claim 1 wherein the canopy section covering the control panel is a roof shell segment.

5. Road-building machine as claimed in claim 1 wherein the canopy can be shortened at the sides by displacing the covering canopy section.

6. Road-building machine as claimed in claim 1 wherein the canopy can be extended sideways by displacing the covering canopy section.

7. Road-building machine as claimed in claim 1 wherein the active lateral roof lengths are aligned transversely to the driving direction (F).

8. Road-building machine as claimed in claim 1 wherein the canopy has an at least three-part roof shell whose roof shell segments are arranged so as to be displaceable one above the other.

9. Road-building machine as claimed in claim 1 wherein the canopy has a number of roof shell segments which can be pushed together like slats.

10. Road-building machine as claimed in claim 1 wherein at least one middle roof shell segment of the roof shell is arranged fixed, relative to which roof shell segments are arranged for lateral displacement.

* * * * *